UNITED STATES PATENT OFFICE.

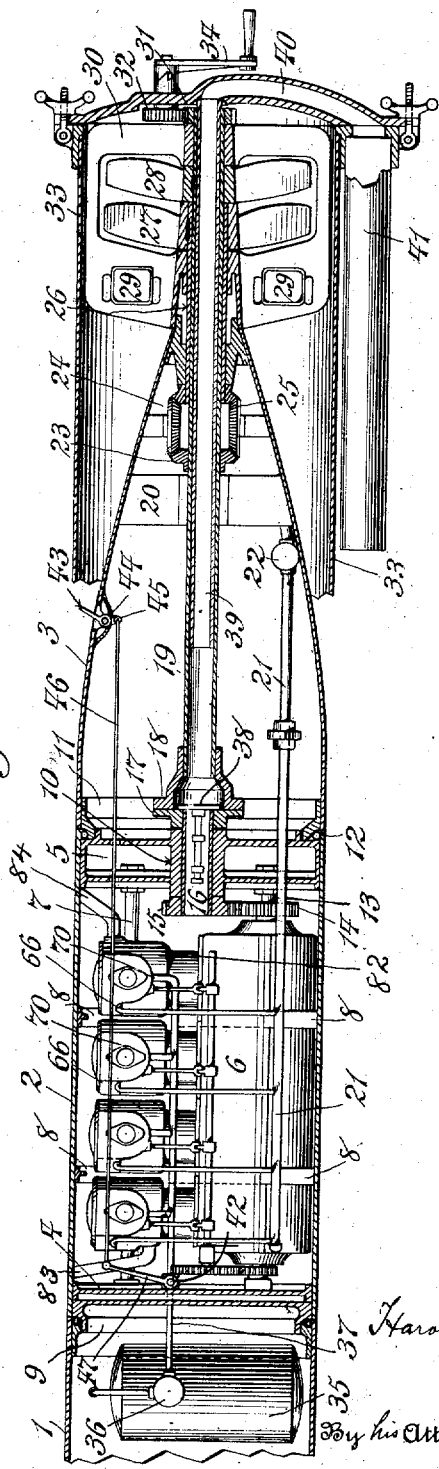

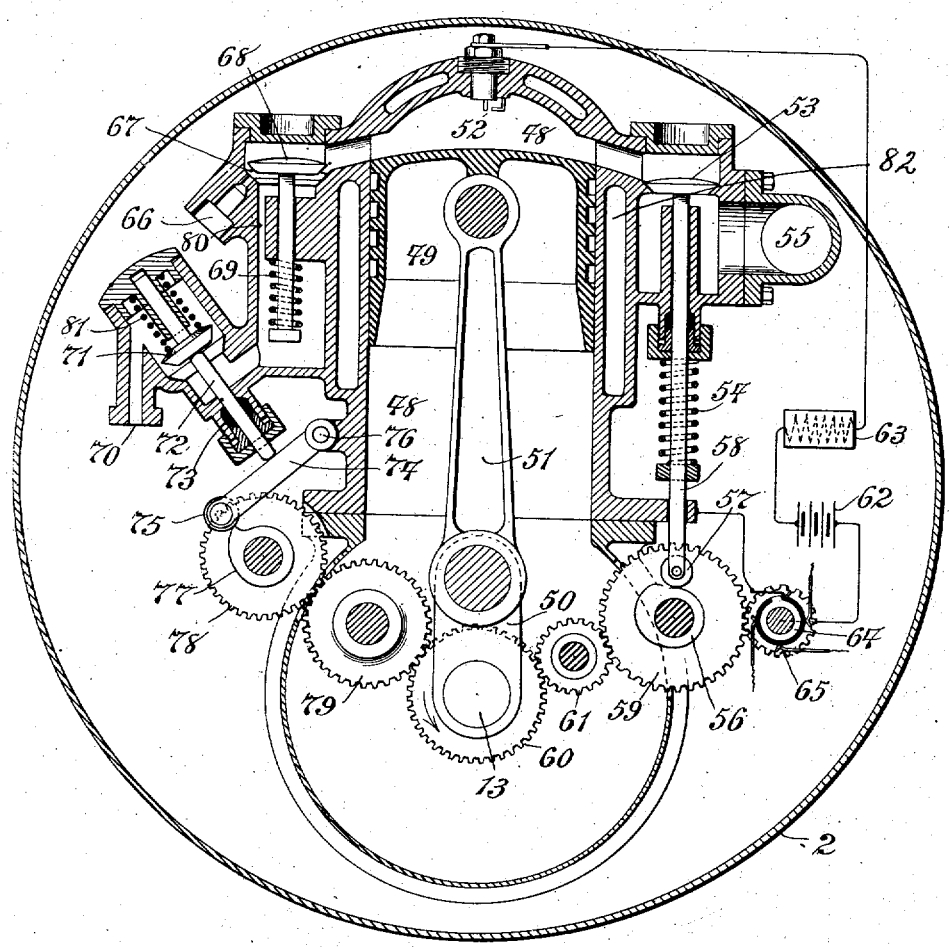

HAROLD W. SHONNARD, OF EAST ORANGE, NEW JERSEY.

SELF-PROPELLING TORPEDO.

973,141.  Specification of Letters Patent.  Patented Oct. 18, 1910.

Application filed February 21, 1908. Serial No. 417,214.

*To all whom it may concern:*

Be it known that I, HAROLD W. SHONNARD, a citizen of the United States, residing in East Orange, county of Essex, and State of New Jersey, have invented a certain new and useful Improvement in Self-Propelling Torpedoes, of which the following is a specification.

Self propelled submarine torpedoes have hitherto been driven by engines impelled by compressed air, (in some cases after preliminary heating) which air is stored in a tank within the torpedo body. Torpedoes of this type are subject to several disadvantages which it is the object of my present invention to remove. Among these are principally the following:—The containers for the compressed air ordinarily employed in supplying the power to drive torpedoes have to be made very large and of very great strength and weight in order to contain a sufficient volume of air under adequate pressure for driving the torpedoes over the length of range exacted by present regulations. One disadvantage of these conditions is found in the difficulty of handling and the necessity of using large and very expensive torpedoes. Another, and a very serious, disadvantage lies in the danger of a shot from the enemy striking and fracturing one of these large air containers during an action. Such a contingency would involve the immediate destruction of the vessel carrying the torpedo struck. Besides these difficulties, conditions of modern warfare are continually raising the standard of range, and the maximum range attainable by the largest torpedoes is already insufficient for many purposes. Moreover, the torpedoes capable of covering a maximum range at adequate speed, are so large and clumsy as not to be capable of use on torpedo boats; being employed only on shore or on battle ships.

It is the principal object of my present invention to provide a form or torpedo equipment whereby there may be attained a range of attack very considerably in excess of that hitherto possible for the very largest torpedoes; and also to make it possible to use relatively small and inexpensive torpedoes for long range work. The advantages of these results, from the point of view of economy, of ease and rapidity of operation, and of increase in attacking force on each torpedo boat are obvious.

Other advantages inherent in certain preferred embodiments of my invention are the possibility of making sure that the driving engine is running properly before launching the torpedo—the silent starting of the engine to avoid alarming the enemy—and the use of a form of fuel which avoids accidental explosion due to leakage within the torpedo body.

My invention contemplates the use of a relatively small volume of combustion-supporting gas under high pressure, and the utilization of the same with a proper fluid fuel—preferably stored in liquid form—so as to make available the energy due to chemical combination of the two in an explosion engine. Thus a far greater storage of energy is possible than by merely using the elastic force of a compressed gas.

An illustrative form of my invention is shown in the accompanying drawings wherein—

Figure 1 is a central longitudinal section of that part of a torpedo containing my invention, the same being shown in starting position within its launching tube, a portion only of which is shown, Fig. 2 is a transverse section showing a somewhat modified form of engine and Fig. 3 is a detail.

The torpedo shell, as shown, comprises three parts, 1, 2 and 3 united by water-tight joints of well known character. The forward compartment, 1, contains the explosible "war-head" and the storage tank for the combustion-supporting gas. Within the middle compartment, 2, is located the driving engine. The rear compartment, 3, supports the steering mechanism of known construction, propellers and driving shaft, as well as the storage tank for the fuel. While the location of the two storage tanks in the positions shown is found convenient, it is not essential to my broad invention.

A four-cylinder engine is shown in the drawings, but of course a greater or a less number of cylinders may be employed. In any case, it is preferred to mount this engine so that it can be easily slid into and out of place, as a whole, through the rear end of the middle compartment, when the rear portion 3 of the shell is removed. For this purpose I provide two movable supporting spiders, 4 and 5 which fit within the shell 2, as shown, so as to slide easily in and out. Between these supports, the engine is fixed by means of fore and aft bars 7, united to the sides of the engine casing as by ribs 8. These ribs pass over the engine and fit within the shell 2 so as to slide therein. The forward support, 4, abuts flat against a solid transverse water-tight bulk-head 9, riveted and soldered to the shell 2. This bulkhead is preferably provided with a circular lip for accomplishing water-tight union with the shell-section, 1, as shown. The rear support 5, is preferably double, as shown, and occupies the rear opening of the shell-section 2. It is provided with a strong hub 10. Within the forward end of the shell-section 3 there is provided a ring 11, permanently fastened in place, and between which and the support 5 is located the gasket 12.

The engine is of the internal explosion type, one form of which is described hereinafter, and the main driven shaft thereof is shown at 13, provided at the rear end with a driving spur gear wheel 14. The gear wheel 14 meshes with a pinion 15 on the end of a short hollow transmission shaft 16 which finds its bearings in the hub 10. The rear end of the transmission shaft 16 is provided with one member 17 of a well known form of a slidable clutch which engages with a suitable second clutch member 18 on the forward end of the main hollow propeller shaft 19. The clutch is best shown in Fig. 3. Extending rearward, the hollow shaft 19 passes through the annular storage tank 20 which contains the liquid fuel producing the fuel gas in the engine. Various well known means for properly feeding the fuel to the engine cylinders are within the scope of my invention, and in the illustrative form shown the liquid is stored in the tank 20 under considerable pressure, and the liquid is delivered to the feed pipe 21 through the pressure reducing valve 22. By reason of the location and form of the tank 20, the liquid fuel will always be permitted to occupy the lowest point, whatever the temporary rolling or lateral movement of the torpedo. Just back of the tank 20, the shaft 19 is provided with a beveled gear 23 which coöperates in a well known manner with the gears 24, 25, the sleeve 26 and the oppositely slanted propeller blades 27, 28 so as to drive the torpedo forward without exerting any tendency to turn it around its longitudinal axis. Rudder blades of well known character are shown at 29. The shaft 19 extends rearward a little beyond the bearing bracket 30, being provided with a pinion 31, adapted to mesh with the cranking pinion 32, when the torpedo is in firing position within the launching tube 33. A one way crank 34 is used to turn the pinion 32, and is within reach of the gunner. This is used to "crank" the engine on the start.

While I have shown the above described means whereby preliminary rotation is directly and manually imparted to the engine, my invention covers any means, whereby the engine may be started independently of motion of the torpedo body, and before the torpedo is launched. This is a very important feature of my invention as less broadly claimed, because, owing to the uncertainty of the starting of internal explosion engines, it is most desirable to make sure that the driving engine is properly running before the torpedo is started out of the tube and before it gets beyond the control of the gunner. It is clear that it would be most dangerous to launch a loaded torpedo in front of a torpedo boat without being sure that its propelling machinery was working properly, and it is to make it possible to be sure of this that I have devised means for starting the engine before launching the torpedo.

The tank 35 in the forward compartment contains the gas which, on mingling with the fuel supplied from the tank 20 within the cylinders of the engine 6, forms an explosive mixture for driving the engine. I prefer to use for this purpose oxygen gas which is stored in the tank 35 under a very considerable degree of compression. The gas is preferably supplied through the reducing valve 36 to the feed pipe 37 leading to the cylinders of the engine 6, as shown in Fig. 1. This reducing valve, while lessening the degree of pressure of the gas as compared with its condition within the tank 35 nevertheless supplies the gas to the engine under a considerable degree of pressure, approximately 60 pounds to the inch.

The exhaust gases are discharged from the engine as heretofore described and are preferably received first within the middle compartment 2 of the torpedo shell and finally take exit through the hollow shafts 16 and 19 at the rear of the torpedo. The short hollow shaft 16 is provided with a sliding check valve 38 which prevents entrance of water into the compartment 2 and at the same time allows exit of the exhaust gases when they have accumulated sufficiently so that the pressure which they exert overcomes the pressure of water upon the valve.

In firing the torpedo a temporary exhaust tube 39 is first inserted at the rear end of the shaft 19 and the torpedo is placed within the launching tube 33 as shown, bringing the expanded rear end of the tube 39 in position to fit within the corresponding depression in the breech of the launching tube from which depression the passage 40 leads to the muffling drum 41 through the breech of the tube. This is to insure a quiet exhaust on the start, when there is no considerable back pressure. The engine is then started by means of the crank 34 which revolves the shafts 19 and 16 and through them the main shaft of the engine 6. At the time of starting the power of the engine is greatly reduced by throttling the pressure of the gas from the tank 35 by means of any convenient valve as 42 in the pipe 37. As heretofore explained the supply of explosive mixture to the cylinders of the engine depends upon the pressure of the gas from the tank 35.

The expression "operating fluid" in my claims is intended to apply to either the fuel or the gas intended to be combined with it within the cylinders.

The engine having started under low pressure and at low speed it leaves the launching tube 33 and the pressure created within the launching tube on firing, acting against the expanded head of the tube 39, causes said tube to be left behind to be used again. As soon as the torpedo enters the water, the valve 42 is opened wide by the pressure of the water upon the pivoted lever or paddle 43 which is forced backward by the water transmitting its movement through the shaft 44, the arm 45, the connecting rod 46 and the lever 47 to the valve 42. As soon as this is accomplished full power is admitted to the engine and full speed of the torpedo is rapidly attained. The use of other automatic means for this purpose is within my invention. In Fig. 2 is shown one form of a four cylinder engine which may be used in this connection, the same being shown in vertical section through one cylinder. The cylinder space is shown at 48 and within it slides the usual piston 49 connected to the main shaft 13 by crank 50 and connecting rod 51. The inlet and exhaust ports are at the top of the cylinder 48 as is also the spark gap 52. The exhaust is controlled by the puppet valve 53 which is normally held to its seat by the spring 54 and when raised allows the exhaust to pass from the cylinder 48 through the opening 55 to the space within the shell 2 outside of the engine as heretofore described. The exhaust valve is controlled by a cam 56 upon which rests the roller 57 on the bottom of the valve stem 58. The cam 56 is revolved by means of the pinion 59 which is driven from the main shaft 13 by means of pinions 60 and 61. The spark at 52 is produced by the battery 62 and spark coils 63, the circuit being closed for each cylinder of the engine in succession in a well known manner by the commutator 64 which is revolved by pinion 65 which meshes with the pinion 59.

The fuel (preferably gasolene or liquid acetylene) is admitted at the opening 66, and is led to a circular groove 67 in the seat of a puppet valve 68 normally held down by the spring 69, which valve controls admission of the fuel to the cylinder 48.

The compressed oxygen or other appropriate gas is led through the opening 70 to the upper side of the puppet valve 71 whose stem 72 passes through a stuffing box 73 and impinges upon an operating lever 74 which is provided with a roller 75 at its outer end and is pivoted to the engine at 76. The roller 75 rests upon an operating cam 77 which is revolved by the pinion 78 driven by means of the pinions 60 and 79. The oxygen after passing through the valve opening at 71 is led by the passage 80 to the under side of the valve 68. Being under considerable pressure, the gas lifts the valve 68 and, as it rushes into the cylinder 48 carries with it the fuel contained in the groove 67 in the valve seat. As shown in Fig. 2 the valve 71 is opened by means of the lever 74 which is lifted when the cam 77 raises the roller 75. This occurs immediately after the valve 53 has been allowed to close by the cam 56.

With the parts in the position shown at Fig. 2 the combined oxygen and fuel will rush into the space above the piston 49 and will be therein contained in a state of considerable compression. A moment later the cam 77 will drop the roller 75 and lever 74 and the spring 81 will close the valve 71 which will be held to its seat by the pressure behind it. The pressure being equalized on the valve 68, the spring 69 will close it and, as the explosion immediately takes place within the cylinder 48 the pressure created will hold the valve 68 firmly to its seat. This operation takes place in the different cylinders of the engine successively in a well known manner.

It will be seen that by supplying the gas to the engine under high compression I am able to get a complete cycle of operation in each cylinder for every revolution of the shaft 13, as the pistons 49 do not have to be used for compressing the gases of combustion. This enables me to obtain a very high power in a comparatively small engine and thus reduces the space required for accommodating the engine within the torpedo body. I obtain a further gain in power in proportion to the space occupied by preferably using oxygen gas instead of air within the tank 35 and by means of these expedients I get a vastly increased range of movement for the self-propelling torpedo without so increasing the weight and size of the engine as to impair the buoyancy of a torpedo of standard size.

In certain of my claims herein I have claimed means for supplying the fuel separately from the combustion-supporting gas. This is intended to express the fact that the combustion-supporting gas and fuel are not originally mixed, but are brought separately to the engine to be there mixed before introduction into the working cylinders.

In some cases it will be best to supply the explosion engine with a water-cooling jacket, although this is not always essential and adds to the weight of the torpedo. When such a jacket is used, I prefer to make the movement of the torpedo through the sea cause the requisite circulation of water through the jacket. In the drawings I show the jacket at 82, and in order to produce water circulation through the same, I use a pipe 83 to lead the sea water from a point forward of the engine into the lower part of the jacket, while, from the upper part of the jacket at the rear of the engine, I lead the water out to the sea again by the pipe 84. By reason of the location and inclination of the pipes 83, 84, the circulation of water is set up.

What I claim is—

1. In combination with a self-propelled submarine torpedo body, and a propeller therefor, an internal explosion engine operatively connected to said propeller comprising cylinders and means for producing explosions in each cylinder, a reservoir of non-inflammable combustion-supporting gas stored under high pressure independently of the operation of the engine, means for supplying such gas at proper intervals under compression to the engine, and means for separately supplying fuel to said engine, substantially as described.

2. In combination with a self-propelled submarine torpedo body and a propeller therefor, an internal explosion engine operatively connected to said propeller comprising cylinders and means for producing explosions in each cylinder at every revolution thereof, a reservoir of non-inflammable combustion-supporting gas stored under high pressure independently of the operation of the engine, means for supplying such gas at proper intervals under compression to the engine, and means for separately supplying fuel to said engine, substantially as described.

3. In combination with a self-propelled submarine torpedo body and a propeller therefor, an internal explosion engine operatively connected to said propeller comprising cylinders and means for producing explosions in each cylinder, means for supplying a combustion-supporting gas under compression to said engine, means for separately supplying fuel thereto, a mixing valve for combining said gas and fuel, and means for causing said valve to form appropriate quantities of said combined gas and fuel for each explosion in said engine.

4. In combination with a self-propelled submarine torpedo body and a propeller therefor, an internal explosion engine operatively connected to said propeller comprising cylinders and means for producing explosions in each cylinder at every revolution thereof, means for supplying a combustion-supporting gas under compression to said engine, means for separately supplying fuel thereto, a mixing valve for combining said gas and fuel, and means for causing said valve to form appropriate quantities of said combined gas and fuel for each explosion in said engine, substantially as described.

5. In combination with a torpedo body, an internal explosion engine within the same, a propeller, a propeller shaft therefor operatively connected to said engine, a launching tube, a crank having a driven shaft passing through the breech of said tube, and means whereby movement of said crank is imparted to said propeller shaft, substantially as described.

6. In combination with a torpedo body, an internal explosion engine, an annular tank containing liquid fuel behind said engine, a propeller shaft connected to said engine and extending rearward through said tank, and a propeller on said shaft, substantially as described.

7. In a submarine torpedo, a shell composed of two separate sections, one behind the other, a driving engine arranged to be slid freely into and out of the more forward of the two sections, a short shaft permanently geared to said engine, a propeller shaft carried by the rear section, a clutch for connecting the two shafts, and means for connecting the two shell sections in a water-tight manner, substantially as described.

8. In combination with a torpedo body, a propeller therefor, an internal explosion engine operatively connected to said propeller, a launching tube, a muffler, and means for connecting the exhaust of said engine with said muffler when the torpedo is in place in said tube, substantially as described.

9. In combination with a torpedo body, a propeller therefor, an internal explosion engine operatively connected to said propeller, a launching tube, a muffler, and removable means adapted to be inserted into the torpedo body for connecting the exhaust of said engine with said muffler when the torpedo is in place in said tube, substantially as described.

10. In combination with a torpedo body, a propeller having a hollow shaft, an internal explosion engine for driving said shaft and arranged to exhaust into said shaft, a launching tube having an opening in its breech, a muffler communicating with said opening, and a removable tube fitting within the propeller and over said opening in the breech, substantially as described.

11. In combination with a torpedo body, a propeller having a hollow shaft, an internal explosion engine for driving said shaft and exhausting into the same, a launching tube having an opening in its breech, a muffler communicating with said opening, and a removable tube fitting over said opening and into said propeller shaft, and having a flange adapted to be acted upon by the pressure which launches the torpedo to cause said removable tube to remain in the launching tube when the torpedo is launched, substantially as described.

12. In a torpedo, a propeller, and an internal explosion engine operatively connected to said propeller and comprising in combination a fuel admission valve, a valve for combustion-supporting gas normally held to its seat by the gas pressure, a passageway between said valves and means operated by the engine for positively opening the gas admission valve at proper intervals, substantially as described.

13. In combination with a submarine torpedo body and a propeller therefor, an internal explosion engine operatively connected to said propeller, a speed controlling device for said engine, and means operated automatically by movement of said torpedo body for actuating said speed controlling device to increase the speed of said engine, substantially as described.

14. In combination with a submarine torpedo body and a propeller therefor, an internal explosion engine operatively connected to said propeller, a supply of fluid fuel within said torpedo body, a supply of compressed gas capable of forming an explosive mixture with said fuel also within said torpedo body, means for conveying said fuel and gas to said engine, a cooling jacket on said engine, and means for leading water into said jacket from the sea and for discharging said water into the sea after it has passed through said jacket, substantially as described.

15. In combination with a submarine torpedo body and a propeller therefor, an internal explosion engine operatively connected to said propeller, a supply of fluid fuel within said torpedo body, a supply of compressed gas capable of forming an explosive mixture with said fuel also within said torpedo body, means for conveying said fuel and gas to said engine, a cooling jacket on said engine, a leading-in pipe extending from said jacket to an opening into the sea forward of the jacket, and a discharge pipe extending from the opposite end of the jacket to an opening into the sea aft of said jacket, substantially as described.

16. In combination with a torpedo body, a propeller, an internal explosion engine operatively connected to said propeller, a launching tube, a muffler, and removable means for connecting the exhaust of said engine with said muffler when the torpedo is in place in said tube, substantially as described.

17. In a torpedo, and in combination, a propeller, a supply of compressed combustion-supporting gas and an internal explosion engine operatively connected to said propeller and comprising a valve normally held to its seat by said compressed gas, and means for opening said valve to admit said gas to said engine at proper intervals, substantially as described.

HAROLD W. SHONNARD.

Witnesses:
H. S. MACKAYE,
M. A. BUTLER.